United States Patent
Rangapuram et al.

(10) Patent No.: US 9,507,673 B1
(45) Date of Patent: Nov. 29, 2016

(54) METHOD AND SYSTEM FOR PERFORMING AN INCREMENTAL RESTORE FROM BLOCK-BASED BACKUP

(71) Applicant: EMC Corporation, Hopkinton, MA (US)

(72) Inventors: Ravi Kishore Rangapuram, Bangalore (IN); Kiran Kumar Mv, Bangalore (IN); Ravi Shankar Panem, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 166 days.

(21) Appl. No.: 14/578,132

(22) Filed: Dec. 19, 2014

(51) Int. Cl.
*G06F 12/00* (2006.01)
*G06F 11/14* (2006.01)
*G06F 3/06* (2006.01)

(52) U.S. Cl.
CPC ......... *G06F 11/1469* (2013.01); *G06F 3/0619* (2013.01); *G06F 3/0647* (2013.01); *G06F 3/0683* (2013.01)

(58) Field of Classification Search
CPC ........... G06F 3/0619; G06F 11/1446–11/1469
See application file for complete search history.

(56) References Cited

U.S. PATENT DOCUMENTS

| | | | |
|---|---|---|---|
| 6,938,134 B2* | 8/2005 | Madany | G06F 11/1435 707/999.202 |
| 9,292,520 B1* | 3/2016 | Madiraju Varadaraju | G06F 17/3007 |
| 2016/0070623 A1* | 3/2016 | Derk | G06F 11/1469 714/6.23 |

* cited by examiner

*Primary Examiner* — Daniel Tsui
(74) *Attorney, Agent, or Firm* — Blakely, Sokoloff, Taylor & Zafman LLP

(57) ABSTRACT

Techniques for performing an incremental restore from block-based backup are described herein. One method starts by parsing entries in first block allocation table (BAT) associated with first full backup information of parent volume to determine BAT entry corresponding to start of parent volume. Merged BAT associated with resultant image is then generated based on first BAT and incremental BATs respectively associated with one or more incremental backup information. One or more incremental backup information is based on incremental changes to parent volume subsequent to first full backup information being generated. Volume used blocks information is then generated based on merged BAT. Volume used blocks information includes start location of each volume used block. Starting from the entry corresponding to start of parent volume, data in blocks identified by each entry in merged BAT are read and written to target volumes corresponding respectively to each entry in merged BAT.

20 Claims, 11 Drawing Sheets

METHOD AND SYSTEM FOR PERFORMING AN INCREMENTAL RESTORE FROM BLOCK-BASED BACKUP

FIELD OF THE INVENTION

Embodiments of the present invention relate generally to data storage systems. More particularly, embodiments of the invention relate to performing an incremental restore from block-based backup.

BACKGROUND

In modern computer systems, a file system stores and organizes computer files to enable a program to efficiently locate and access requested files. File systems can utilize a storage device such as a hard disk drive to provide local access to data or to utilize a network to provide access to data stored on a remote file server over the network. A file system can also be characterized as a set of abstract data types that are implemented for the storage, hierarchical organization, manipulation, navigation, access, and retrieval of data. The file system software is responsible for organizing files and directories.

Many companies and individuals with large amounts of stored data employ a file system as a data storage system. These data storage systems can be located local to the data to be backed up or at a remote site. The data storage systems can be managed by the entity controlling the data storage devices or a data storage service company. Data can be added to the storage system at any frequency and at any amount.

Data storage systems may offer storage for backup and disaster recovery. Transfer to remote storage may require the transfer of data over a network. A local client data backup application prepares and sends data from the local file system to a backup system. The backup system stores the data received from the local client application to be utilized in the event of a corruption or failure at the computing device executing the local client data backup application.

In some modern computer systems, operating systems have built-in support to create and mount files in a specific format such as the VHDx type files. The VHDx files may be in a container format that contain disk related information and volumes or any file system which the operating system supports on the mounted disk may also be created.

Modern data storage systems create backup images in VHDx container. The backup images are full and incremental backup of a target volume. Full backups contain either all blocks or used blocks of the volume in VHDx and incremental backups contain changed blocks embedded in the VHDx container. To create a full and incremental backup of a target volume, all or only changed blocks of the target volume are copied into a VHDx format. A VHDx stream is created which contains all the VHDx related metadata and the disk metadata such as Master Boot Record (MBR), GUID Partition Table (GPT), and the volume contents on the fly. The VHDx stream is then streamed to the backup medium such as TAPE or DISK targets as a single stream. The resulting save set can then be mounted which will contain the aggregated volume to be recovered. The resulting VHDx file contains only one volume, which makes it easier to chain incremental backups of a particular volume, which will be linked to its parent.

Accordingly, since the respective backup image needs to be mounted on a client device to perform incremental image recovery, the current solution is dependent on having an operating system capable of supporting and mounting the VHDx file. Even when mounting is an option, the current recovery performed from the full and incremental backup of a target volume inefficiently requires reading the blocks from each backup multiple times before copying the blocks.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
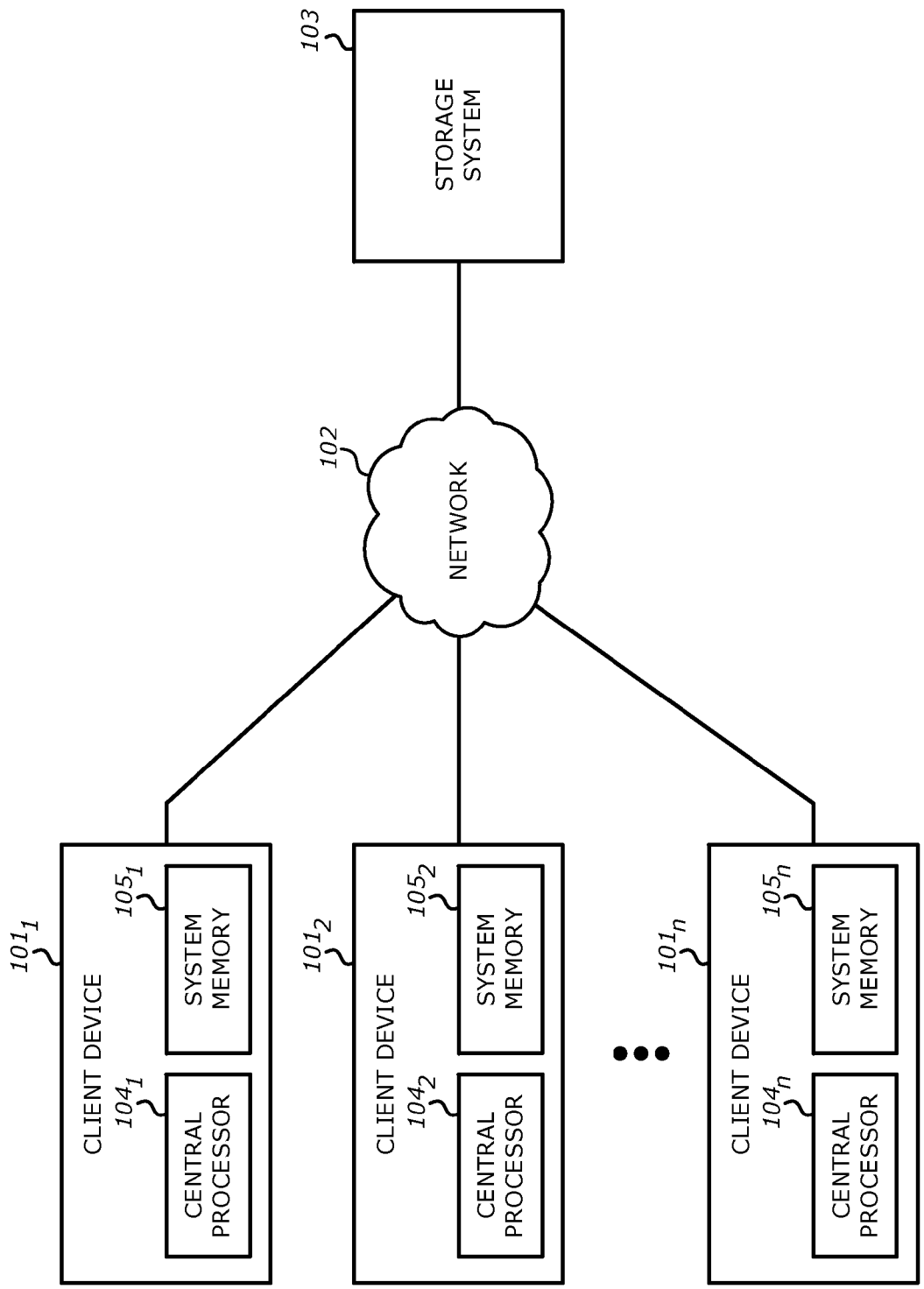
FIG. 1 is a block diagram illustrating an environment in which a storage system according to one embodiment of the invention may be implemented.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

As discussed herein above, data backup and data backup systems are designed to store a copy of a set of data storage systems in case of disaster recovery (DR) or similar scenarios. DR is a process of preparing for recovery or continued operation of technology infrastructure critical to an organization after a disaster that renders a computer inoperable or corrupts the data on the physical disk. One of the critical aspects of DR planning is timely recovery of data and processes following the incident. Organizations develop recovery strategies to ensure that the system downtime is minimal at best, within acceptable limits/threshold and predictable. For reducing outage time, the system should be recovered quickly and effectively following disruption. Currently, time to recover depends on the type of data and the size of critical data.

In backup systems, the backed up data is stored as a set of snapshots of the data storage system that are captured over time. This is in contrast to 'standard' backup processes that makes a duplicate and compresses it into another format on the backup system. Snapshot based backup can provide a backup with less downtime or disruption to the data storage system and that can provide a fast data recovery process. There are several types of storage snapshot systems including copy-on-write and split-mirror snapshot systems. The capacity to generate these snapshots is included in many data backup clients.

A copy-on-write snapshot creation process generates a snapshot of changes to stored data every time new data is stored or existing data is modified on the data storage system. Thus, the backup data is always up to date enabling immediate recovery of data in its most recent form in case of a failure. However, all previous snapshots from the point of failure to the last full snapshot image of the data storage system must be available for recovery.

A split-mirror snapshot process references all the data on a set of mirrored drives. Each time the process is executed, a snapshot is created of the entire volume, rather than just the changes to the volume. Having complete snapshots simplifies the process of recovering, duplicating, or archiving all the data on a drive. However, this is a slower process, and it requires more storage space for each snapshot and changes made since the last snapshot are lost.

In some embodiments, the snapshots are generated by leveraging the snapshot capabilities of either data storage system hardware/Array based capabilities (e.g., the Symmetrix or similar backup software programs) or related software based capabilities (e.g., capabilities virtualization or volume management software or similar data storage system related software). The Symmetrix system is a system of EMC Corporation of Hopkinton, Mass. A system for snapshot backups can have the following major components:

(1) a source/production host: this is the host data storage system where the production data is hosted (i.e., the data to be backed up);

(2) a source logical unit number (LUN): the source host has the production data provisioned to the source LUN (i.e., the production data is stored in a source LUN), e.g., a production host can have source LUNs coming from Symmetrix or similar data storage systems;

(3) a mount host/data mover/proxy: these are different names for the same component, this is the host system where the backup snapshots are mounted;

(4) target LUN: the mount host has the storage of the backup snapshots provisioned to the target LUN, e.g., the mount host has target LUNs coming from Symmetrix or similar data storage systems; and (5) backup server: the backup server includes a policy engine (amongst other components, which manages the backup process. Though the snapshots are handled at the data storage array or software level (dependent on the production host), the metadata information related to the snapshot backup process goes to a backup server catalog managed by the backup server; and (6) zoning: a logical grouping of data storage arrays using a set of switches, both source and mount hosts are zoned properly to associated data storage arrays using respective sets of switches.

FIG. 1 is a block diagram illustrating an environment in which a storage system according to one embodiment of the invention may be implemented. The environment in FIG. 1 includes one or more client devices $101_1$-$101_n$ (n>1) communicatively coupled to the storage system 103 over network 102.

Client devices $101_1$-$101_n$ may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of client devices $101_1$-$101_n$ may be a primary storage system that provides storage to other local clients, which may periodically back up the content stored therein to the storage system 103. Each of the client devices $101_1$-$101_n$ may respectively include a central processor $104_1$-$104_n$ and a system memory $105_1$-$105_n$. Each of the central processors $104_1$-$104_n$ may include multiple processors or a multicore processor, which may permit parallel processing of information. Each system memory $105_1$-$105_n$ may have stored therein instructions that may be executed by the central processor $104_1$-$104_n$, respectively, to cause the central processor $104_1$-$104_n$, to control its client device $101_1$-$101_n$. For instance, the system memory $105_1$ may have stored therein instructions, which when executed by the central processor $104_1$, causes the system processor $104_1$ to run an operating system for the client device $101_1$. The memory device $105_1$ may include a machine (e.g., a computer) readable storage medium (e.g., read only memory ("ROM"), random access memory ("RAM"), magnetic disk storage media, optical storage media, flash memory devices).

Network 102 may be any type of networks such as a local area network (LAN), a wide area network (WAN) such as the Internet, a fiber network, a storage area network (SAN), or a combination thereof, wired or wireless. Client devices $101_1$-$101_n$ may be in physical proximity or may be physically remote from one another. Storage system 103 may be located in proximity to one or neither of clients $101_1$-$101_n$.

Figure 2:
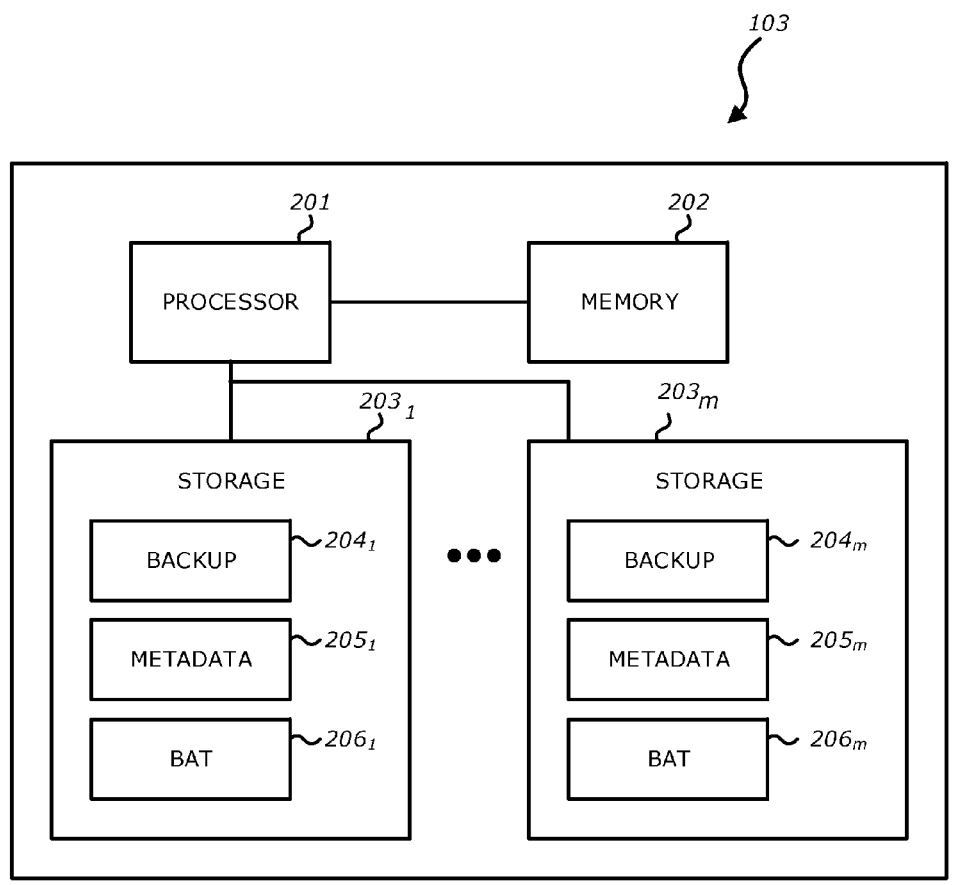
FIG. 2 is a block diagram illustrating a storage system according to another embodiment of the invention.

FIG. 2 is a block diagram illustrating a storage system 103 according to another embodiment of the invention. Storage system 103 may include any type of server or cluster of servers. For example, storage system 103 may be a storage server used for any of various different purposes, such as to provide multiple users with access to shared data and/or to back up data and restore data. In one embodiment, storage system 103 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 103 may have a distributed architecture, or all of its components may be integrated into a single unit. Storage system 103 may be implemented as part of an archive and/or backup system such as a deduplicating storage system available from EMC® Corporation of Hopkinton, Mass.

As shown in FIG. 2, the storage system 103 includes a processor 201, a memory 202 and one or more storage units $203_1$-$203_m$ (m>1) communicatively coupled to each other. The processor 201 may include multiple processors or a multicore processor, which may permit parallel processing of information. The memory 202 may have stored therein instructions that may be executed by the processor 201 to cause the processor 201 to control the storage system 103. The memory 202 may include a machine (e.g., a computer) readable storage medium (e.g., read only memory ("ROM"), random access memory ("RAM"), magnetic disk storage media, optical storage media, flash memory devices). Note that, some or all of the components as shown in FIG. 2 may be implemented as processing logic in software, hardware, or a combination thereof. For instance, the memory 202 may have stored therein instructions, which when executed by the processor 201 causes the processor 201 to perform an incremental restore from a block-based backup as described herein. Also note that although a backup storage system is utilized as an example of a storage system in which the techniques for performing an incremental restore from a block-based backup, the techniques described throughout this application can also be applied to other types of software or systems.

Storage units $203_1$-$203_m$ may be implemented locally (e.g., single node operating environment) or remotely (e.g., multi-node operating environment) via interconnect, which may be a bus and/or a network (e.g., a storage network or a network similar to network 102). Storage units $203_1$-$203_m$ may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In one embodiment, one of storage units $203_1$-$203_m$ operates as an active storage to receive and store external or fresh user data from a client (e.g., an end-user client or a primary storage system associated with one or more end-user clients), while another one of storage units $203_1$-$203_m$ operates as a target storage unit to periodically archive data from the active storage unit according to an archiving policy or scheme. Storage units $203_1$-$203_m$ may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units $203_1$-$203_m$ may also be combinations of such devices. In the case of disk storage media, the storage units $203_1$-$203_m$ may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

As shown in FIG. 2, each of the storage units $203_1$-$203_m$ may respectively store backup files $204_1$-$204_m$ that correspond to one or more volumes that are configured to store information that needs to be backed up. For example, the volume may be associated with a database or repository in a database system. The volume may be referred to as a parent volume. Backup files $204_1$-$204_m$ may be configured to store back up information related to the one or more volumes. Backup files $204_1$-$204_m$ may be created based on a virtual disk format and may contain information typically contained in a physical volume. For some embodiments, backup files $204_1$-$204_m$ may be created based on the Hyper-V Virtual Hard Disk (VHDx) format according to the VHDx Format Specification, version 1.0, published on Aug. 25, 2012 by Microsoft Corporation of Redmond, Wash. Backup files $204_1$-$204_m$ may be referred to as a VHDx file and may be mounted by an operating system that supports VHDx files. One example of such an operating system is the Microsoft Windows Server 2012 by Microsoft Corp. However, in some embodiments described herein, the incremental restore from block-based backup is performed without mounting the backup files $204_1$-$204_m$ by the operating system.

In one embodiment, at least one of the backup files $204_1$-$204_m$ include a full backup information of a parent volume, one or more incremental backup information, and a merged full backup information. In this embodiment, at least one of the storage units $203_1$-$203_m$ may store a full backup information of a parent volume, one or more incremental backup information that is based on incremental changes to the parent volume that occurred subsequent to the full backup information being generated. At least one of the storage units $203_1$-$203_m$ may store a merged full backup information. At least one of the storage units $203_1$-$203_m$ may also store a volume used blocks information includes a start location of each volume used block.

Each of the storage units $203_1$-$203_m$ may also store metadata $205_1$-$205_m$ and block allocation tables (BATs) $206_1$-$206_m$, that correspond to the backup files $204_1$-$204_m$, respectively. In one embodiment, BATs $206_1$-$206_m$ include a BAT associated with the full backup information, incremental BATs associated with the one or more incremental backup information, and a BAT associated with the updated full backup information. In one embodiment, metadata $205_1$-$205_m$ may be stored in at least some of storage units $203_1$-$203_m$, such that files can be accessed independent of another storage unit. Metadata of each storage unit includes enough information to provide access to the files it contains. For instance, the metadata $205_1$-$205_m$ may include the MBR and GPT associated with the backup files $204_1$-$204_m$. In one embodiment, metadata may include fingerprints contained within backup files $204_1$-$204_m$, where backup files $204_1$-$204_m$ may represent data blocks, respectively.

In one embodiment, storage system 103 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Figure 3:
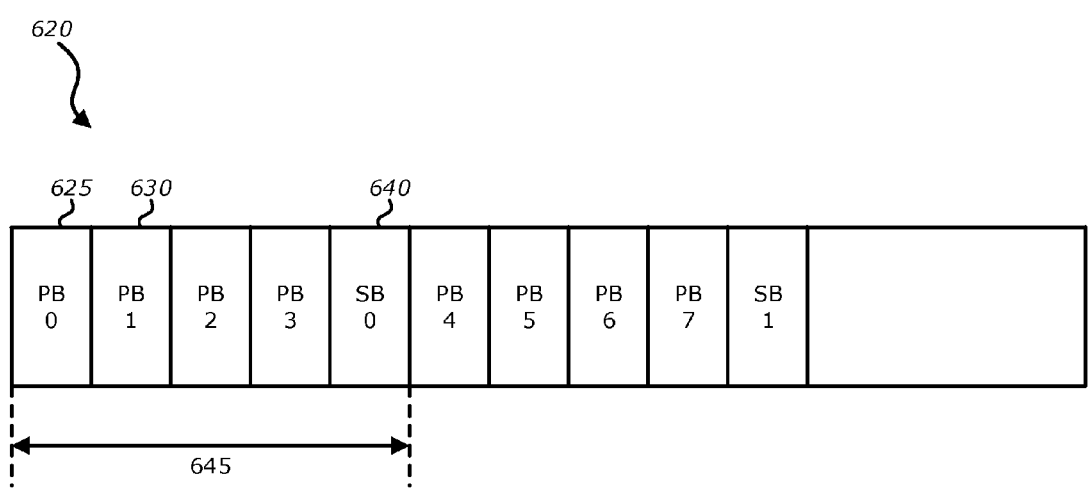
FIG. 3 illustrates an example block allocation table associated with a virtual disk, in accordance with some embodiments.

FIG. 3 illustrates an example block allocation table associated with a virtual disk, in accordance with some embodiments. The block allocation table (BAT) 620 may be associated with a backup file $204_1$. The BAT 620 may occupy a region of the backup file $204_1$ and may include a single array of multiple entries. Each entry may have a certain size (e.g., 64 bits). An entry of the BAT 620 may include information to determine the state and the file offset of a particular block. As shown, the BAT 620 includes entries that point to payload blocks (PB) and sector bitmap blocks (SB). For example, payload BAT entry 625 may point to the payload 0, payload BAT entry 630 may point to payload 1, etc. Each payload BAT entry may include information about the state of a block and the associated offset in the backup file $204_1$. The payload block 0 (PB 0) may contain the first block of bytes of the backup file $204_1$. The payload block 1 (PB 1) may contain the second block of bytes of the backup file $204_1$, etc. A payload block may be associated with a certain block size determined when the backup file $204_1$ is created. For example, each of the payload blocks associated with the payload BAT entries 625 and 630 may have a block size of at least 1 MB and at most 256 MB. The payload BAT entries and the sector bit map BAT entries may be interleaved according to a chunk size. For example, when the chunk size is 4, there is one sector bit map BAT entry following four payload BAT entries, as shown in FIG. 3.

The backup file $204_1$ may be configured to store full backup information of a parent volume. For some embodiments, the backup operation that backs up the parent volume to the backup file $204_1$ may be performed using a block-based approach. In a block-based approach, the information may be read from the parent volume block-by-block regardless of the number of files stored in the parent volume. The backup operation may take an image of the parent volume without having to refer to the file system associated with the parent volume.

For some embodiments, one or more differential or incremental backup virtual disks may be created using the virtual disk format. The incremental backup virtual disks may be created after the creation of the backup file $204_1$ which stores the full backup information of the parent volume. The incremental backup virtual disks may store only the changed blocks in the parent volume. The set of a full backup virtual disk and one or more incremental backup virtual disks may be saved together as a single virtual disk (e.g., VHDx) in a backup medium such as tape or disk and can be mounted for recovery. The full backup virtual disk and the incremental backup virtual disks may be linked to their parent volume. The number of incremental backup virtual disks that can be created may be limited by the availability of system resources. Further, as the number of the incremental backup virtual disks increases, the performance of the restore operations may decrease.

For some embodiments, the full backup information in the full backup virtual disk and the one or more incremental backup information in the incremental backup virtual disks may be merged together to form merged backup information (e.g., the merged full backup information) which may then be saved in a backup medium. The merged backup information may be stored as a virtual disk (e.g., a VHDx) and may include merged sections of the full backup virtual disk and one or more incremental backup virtual disks.

Figure 4:
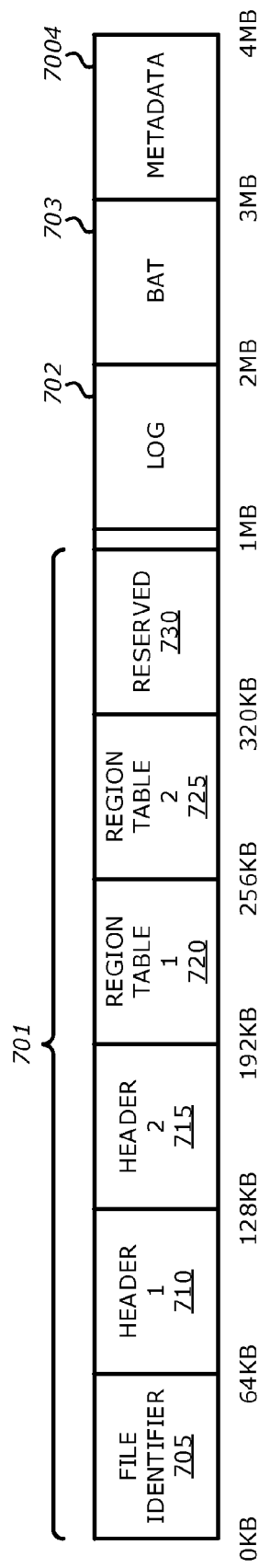
FIG. 4 illustrates example sections of merged backup information, in accordance with some embodiments.

FIG. 4 illustrates example sections of merged backup information, in accordance with some embodiments. The sections may include a header section 701, a log section 702, a BAT section 703, and a metadata section 704. The header section 701 may include a file identifier 705, a first header 710, a second header 715, a first region table 720, a second region table 725, and a reserved region 730. The header section 701 is the first object of the merged backup information virtual disk and is the structure that may be examined first when opening the merged backup information virtual disk. The file type identifier 705 may contain a short, fixed signature to identify that the merged backup information is associated with a virtual disk.

Each of the first header 710 and the second header 715 may act as a root of a virtual disk data structure tree, providing version information, location and size of the log, and some basic file metadata. One of the headers 710 and 715 may be active at a time. The region tables 720 and 725 may list data regions in the merged backup information virtual disk which may be virtually contiguous, variable-size, and aligned. Area 730 is reserved. The log section 702 is pointed to by the first header 710 or the second header 715 and may reside anywhere after the first header 710 and the second header 715. The log section 702 may consist of variable-sized log entries which contain information that may need to be rewritten when the merged backup information virtual disk is reopened after an unexpected system failure event. The BAT section 703 may be listed in the region table 720 or 725 and may consist of a single contiguous array of entries specifying the state and the physical file offset for each block, as described with FIG. 3. The metadata section 704 is variable in size and may be listed in the region table 720 or 725 and may contain metadata, including system and user metadata.

Figure 5:
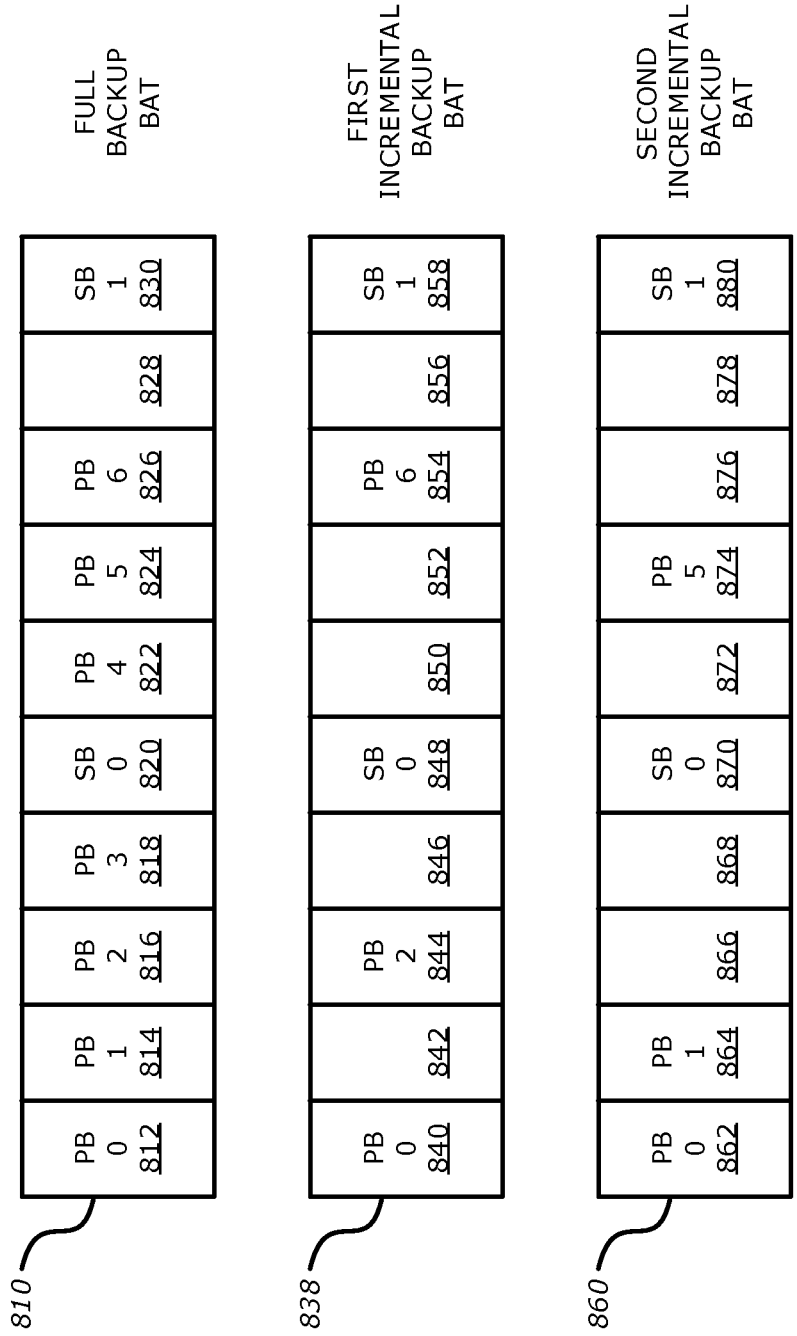
FIG. 5 illustrates some BAT examples as related to backup information, in accordance with some embodiments.

FIG. 5 illustrates some BAT examples as related to backup information, in accordance with some embodiments. The BAT 810 may be associated with a VHDx file that stores full backup information of a parent volume and may include BAT entries 812-830. The BAT 838 may be associated with a VHDx file that stores first incremental backup information and may include BAT entries 840-858. The BAT 860 may be associated with a VHDx file that stores second incremental backup information and may include BAT entries 862-880. Each of the BATs 810, 838 and 860 may be associated with an incremental chain. Each of the BAT entries in the BATs 810, 838 and 860 may include information or descriptors about the corresponding payload block. For example, the BAT entry 812 of the BAT 810 may include identification information, starting address information, and length information of its payload block 0 (PB 0). BAT entry 828 of the BAT 810 is shown as empty (or zero) and may be used to indicate that the BAT entry 828 is not associated with a payload block.

Figure 6:
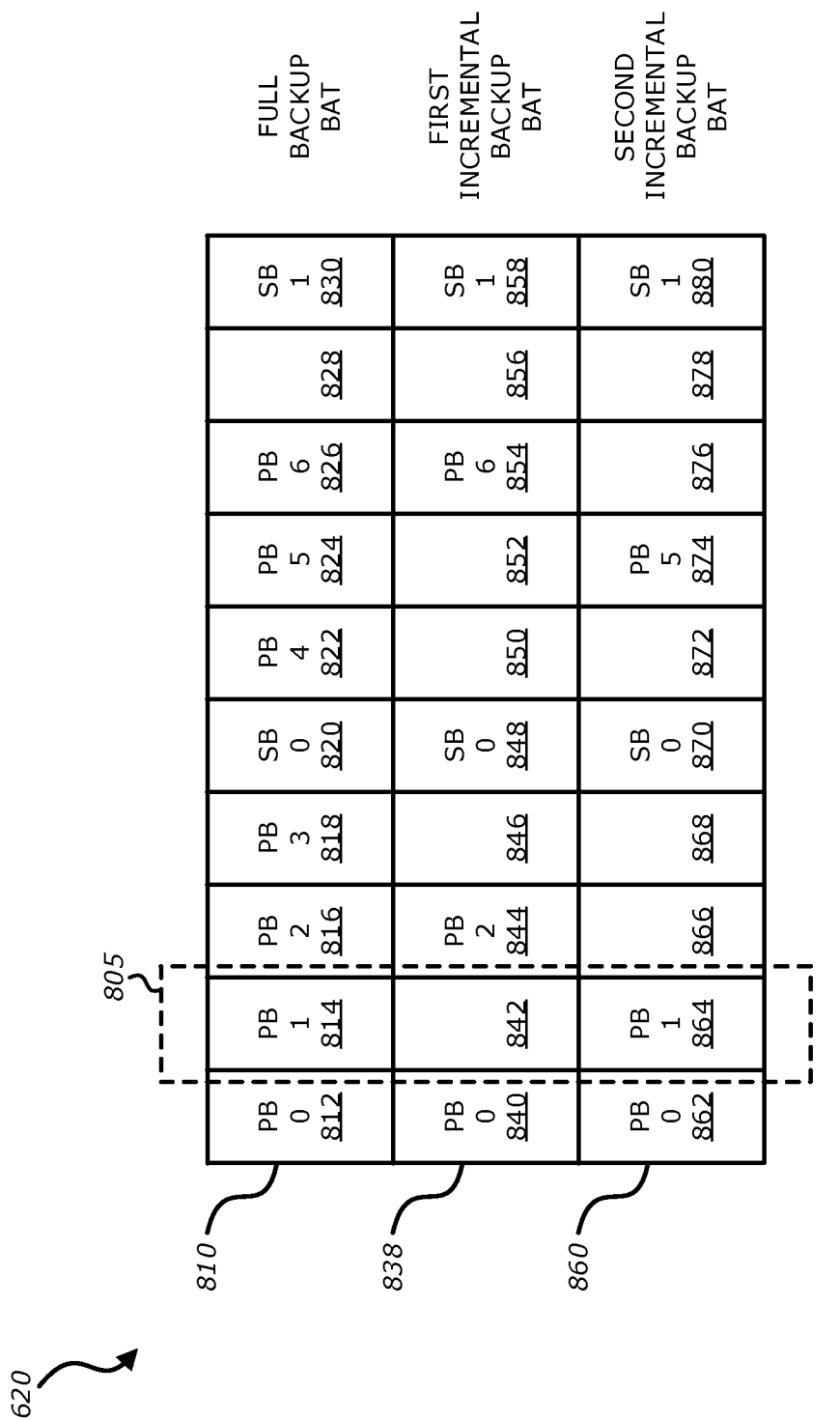
FIG. 6 illustrates an example of an array of BATs, in accordance with some embodiments.

FIG. 6 illustrates an example of an array of BATs, in accordance with some embodiments. The array 808 may include an entry that correspond to a BAT of a VHDx file that stores full backup information and one or more entries that correspond to a BAT of a VHDx file that store incremental backup information. As illustrated, the $0^{th}$ entry of the array 808 includes the BAT 810, the $1^{st}$ entry of the array 808 includes the BAT 838, and the $2^{nd}$ entry of the array 808 includes the BAT 860. A merged BAT may be prepared by evaluating the BAT entries in the array 808 starting from the BAT 810 to the BAT 860 of the last incremental chain. A group of BAT entries (e.g., highlighted by the dotted shape 805) and that corresponds to the same payload block (e.g., PB 1) and may be associated with an index. When there is a BAT entry that includes a non-zero offset (e.g., BAT entries 814 and 864), then that offset may be incorporated into the corresponding entry of the merged BAT.

Figure 7:
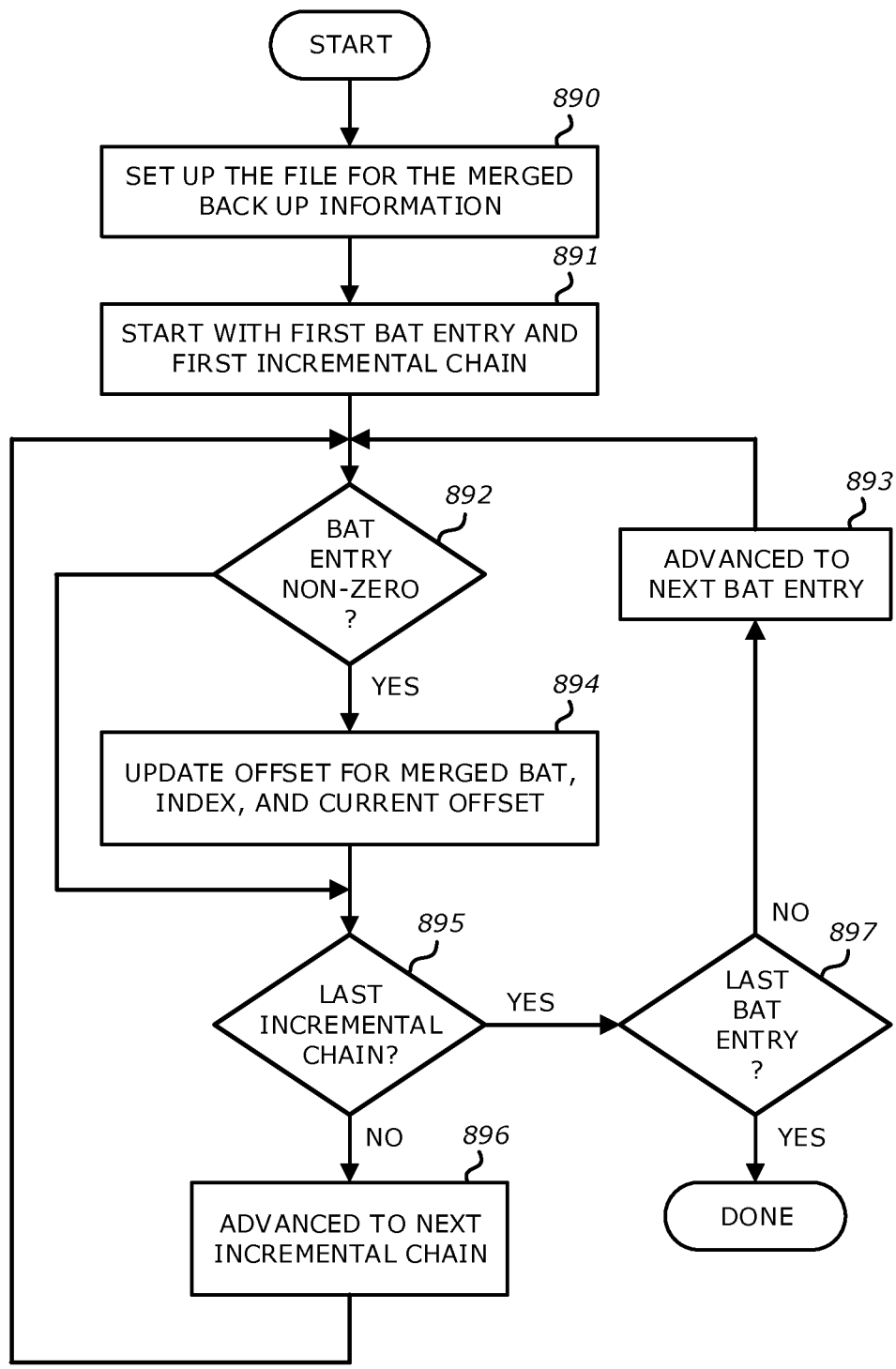
FIG. 7 illustrates an example flow diagram of a process for generating a merged BAT, in accordance with some embodiments.

FIG. 7 illustrates an example flow diagram of a process for generating a merged BAT, in accordance with some embodiments. The process may start at block 890 where the VHDx file used to store the merged backup information may be set up. This may include preparing the VHDx header, log section, BAT section and metadata section (as described with FIG. 4). This may also include keeping track of a current offset, initializing a BAT (as described with FIG. 3), and initializing a merged indexes array. An index array is an array of values used as indexes (as described with FIG. 6) that may be applied with another array which may be, for example, an array of BAT entries.

At block 891, the process may start evaluating the BAT (e.g., BAT 810) of the first incremental chain and a first BAT entry (e.g., entry 812). At block 892, an operation may be performed to determine if the BAT entry is non-zero. Based on the BAT entry being non-zero, the process may continue to block 894 where the corresponding entry of the merged BAT (e.g., MergedBAT[i]) is updated with the current offset. An index may be added to the merged indexes array, and the current offset may be advanced by a size of a block. From block 892, based on the BAT entry being zero, the process may continue to block 895.

At block 895, an operation may be performed to determine if the current incremental chain is the last incremental chain. Based on the current chain not being the last one, the incremental chain is advanced to the next incremental chain. The process may then continue at block 892 where the BAT entry of the incremental chain is evaluated. From block 895, based on the current incremental chain being the last incremental chain, the process may continue at block 897 where an operation may be performed to determine if the current BAT entry is the last BAT entry in the array of BAT entries. Based on the current BAT entry not being the last BAT entry, the process may continue to block 893, where the BAT entry is advanced to the next BAT entry. From block 893, the process continues to block 892 where the BAT entry is evaluated. From block 897, based on the BAT entry being the last BAT entry, the process may stop.

Using the process in FIG. 7, the valid BAT entries are identified in the merged BAT. The valid BAT entries represent the used blocks. In contrast, when a BAT entry is zero, the BAT entry represents an unused block. Using the merged BAT that identifies the used blocks, the volume of the used blocks may then be determined.

Figure 8:
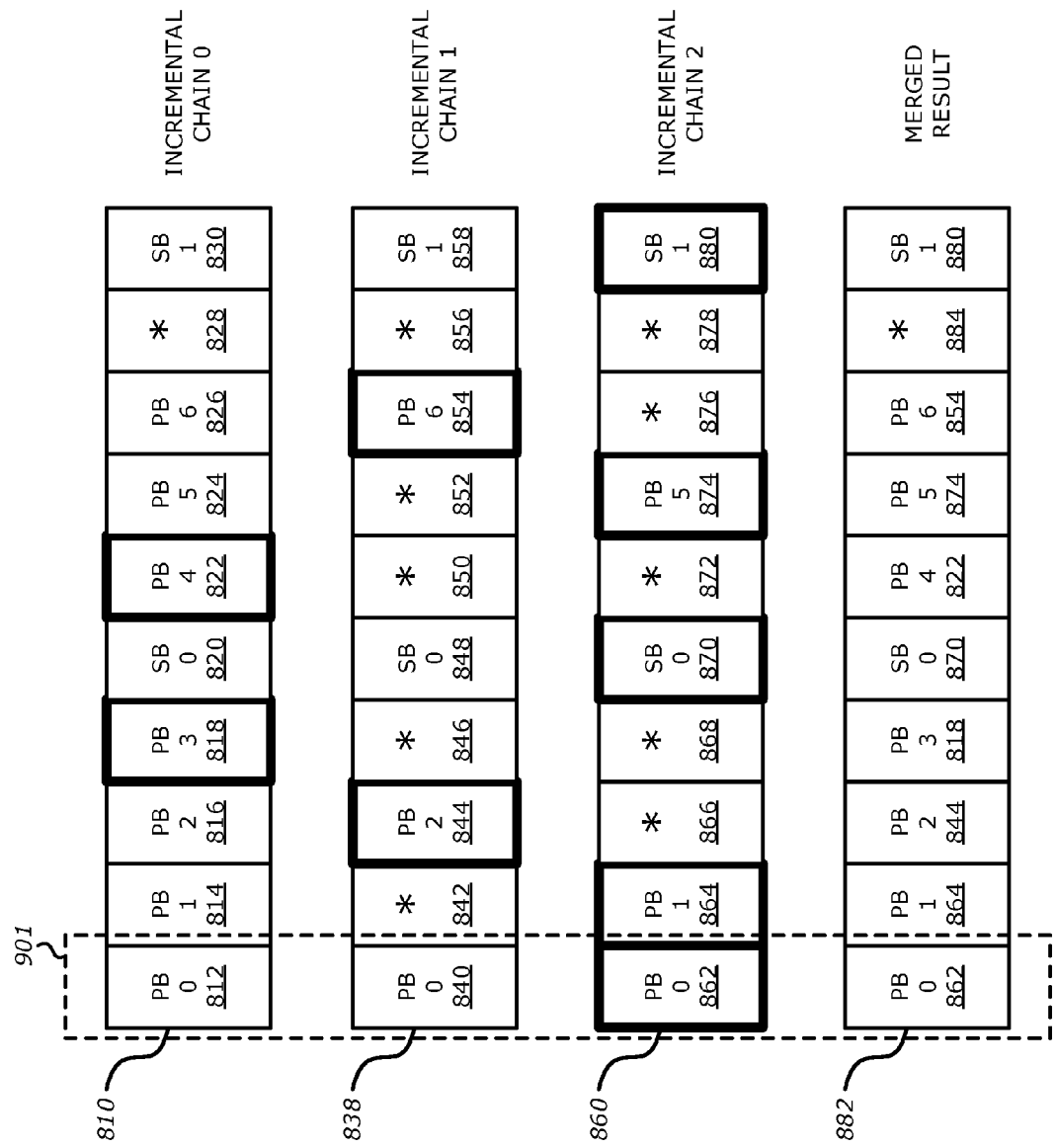
FIG. 8 illustrates a sequential approach of updating the BAT entries, in accordance with some embodiments.

FIG. 8 illustrates a sequential approach of updating the BAT entries, in accordance with some embodiments. The BATs 810, 838 and 860 may each be associated with an incremental chain. The BAT 882 may represent a merged BAT based on the BATs 810, 838 and 860. The group of BAT entries highlighted by the dotted shape 901 may correspond to a first index. The BAT entry 862 of the merged BAT 882 may be first updated in sequence with the information in the BAT entry 812 of the BAT 810, then with the information in the BAT entry 840 of the BAT 830, and finally with the information in the BAT entry 862 of the BAT 860. The BAT entry 862 of the BAT 860 is highlighted to illustrate that its content is reflected in the content of the corresponding BAT entry of the merged BAT 882. It may be noted that the other highlighted BAT entries are also reflected in the merged BAT 882 based on their content and sequence. It may also be noted that the BAT entry shown with the sign "*" (e.g., BAT entries 828, 856 and 878, etc.) may reflect that they are empty or zero because the corresponding payload blocks may not exist.

As described above, a payload block may be associated with a block size (e.g., 2 MB). The BAT associated with a merged payload block may comprise multiple extents, with each extent being associated with an extent size. The size of the extent may be dependent on the changed backup information and may be used to generate the merged payload block. Each extent may be associated with an offset, a length, and an ID. The offset may be based from a starting location of the associated payload block. The ID may correspond to the level of the backup information (e.g., level 0, 1, 2, etc.). By creating the merged BAT 882, the BAT 810 of the full backup information and the BATs 838, 860s of the incremental backup information may be preserved. Using the extents, the merged BAT 882 may determine the latest (most recently updated) blocks from different backup images.

Figure 9:
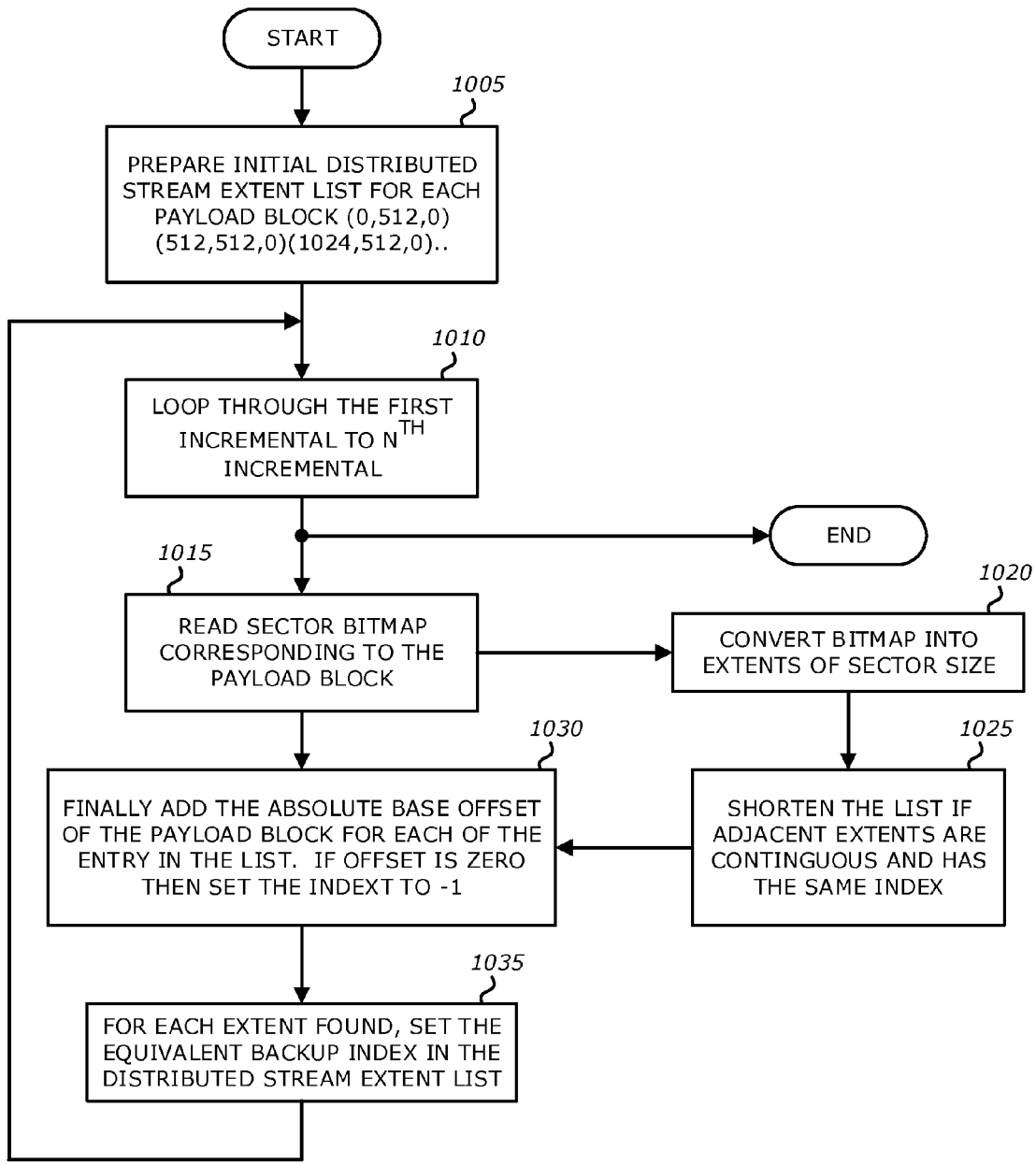
FIG. 9 illustrates an example flow diagram of a process for determining a merged payload block, in accordance with some embodiments.

FIG. 9 illustrates an example flow diagram of a process for determining a merged payload block, in accordance with some embodiments. In this example, the merged payload block may be determined based on a merged BAT (as described with FIG. 8). The process may start at block 1005 where a next merged BAT index may be retrieved from a merged BAT indexes array and where an extent array may be prepared using offset information and extent size. For example, the extent array associated with the full backup information may be (0,512, 0), (512, 512, 0), (1024, 512, 0) and (2 MB-512, 512, 0) in the format (start, length, ID). The process may start with the first incremental chain (e.g., the full backup file) and may loop through the last incremental chain (e.g., the most recent incremental backup file), as shown in block 1010. The process may end when the last incremental chain is evaluated.

At block 1015, the BAT table associated with the current incremental chain is evaluated. The sector bitmap block (e.g., SB 0) corresponding to the current payload block (e.g., PB 0) from the BAT table may be reviewed and bitmap information may be read from the sector bitmap block. At block 1020, the sector bitmap information is used to generate a list of extents based on the extent size (e.g., 512 KB). At block 1025, when it is determined that adjacent extents are contiguous and associated with the same index, those extents may be merged and the list of extents may be reduced. At block 1030, the offset for each of the extent may be set. For some embodiments, when the payload offset is zero, the ID field associated with the extent may be set to a value of "−1" so that the range may include zero values during read operations. This may be advantageous when a payload block cannot be found in any of the incremental chain and may enable referencing to the full backup information. At block 1035, the process may evaluate each of the extent found in block 1020 and 1025 and get the corresponding extent from the array generated in block 1005.

Figure 10:
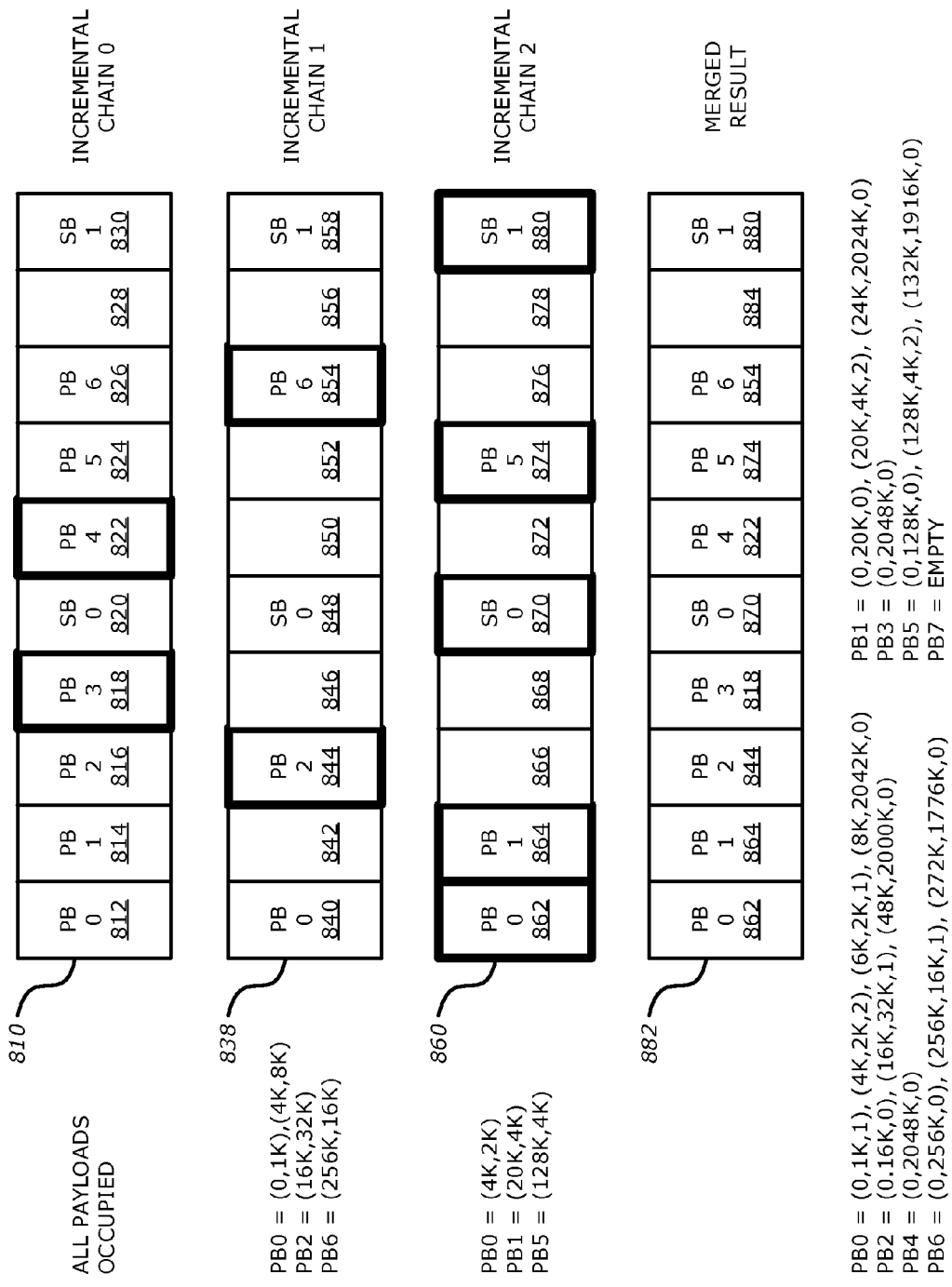
FIG. 10 illustrates an example of a merged BAT together with extent information, in accordance with some embodiments.

FIG. 10 illustrates an example of a merged BAT together with extent information, in accordance with some embodiments. The BATs 810, 838 and 860 and the merged BAT 882 are similar to those illustrated in FIG. 8. In the current example, the payload block size is 2 MB. As illustrated, all of the payload blocks associated with the BAT 810 are occupied (e.g., 0 KB to 2048 KB) to reflect that the BAT 810 is associated with full backup information. The payload blocks PB0, PB2 and PB6 associated with the BAT 838 may be occupied with changed backup information. For example, the PB0 includes changed backup information at offset 0 for 1K and at offset 4K for 8K. The PB2 includes changed backup information at offset 16K for 32K, and the PB6 includes changed backup information at offset 256K for 16K.

Similarly, the payload blocks PB0, PB 1 and PB5 associated with the BAT 860 may be occupied with changed backup information. For example, the PB0 includes changed backup information at offset 4K for 2K. The PB 1 includes changed backup information at offset 20K for 4K, and the PB5 includes changed backup information at offset 128K for 4K.

The extents for the payload blocks associated with the merged BAT 882 are illustrated in FIG. 10 in the format (Start, Length, ID). For example, the PB1 includes three extents (0,20K,0), (20K,4K,2) and (24K,2024K,0). This indicates that the first 20 KB starting from offset 0 is copied from the full backup information (with the ID=0). The next 4 KB starting at offset 20K is to be copied from the second incremental backup information (with ID=2). The remaining 2024 KB from offset 24K is copied from the full backup information (with ID=0). In this example, the block size is 2 MB.

The payload blocks PB0, PB1, PB2, PB5 and PB6 of the merged BAT 882 may need to be generated by merging the corresponding payload blocks of the full backup information and one or more of the first incremental change and the second incremental change. The payload blocks PB3 and PB4 may be the same as the corresponding payload blocks in the full backup information. By merging the full backup information with the incremental backup information associated with the BATs 810, 838 and 860 block-by-block, a merged full volume block-based backup may be generated. Using the merged full volume block-based backup, it may be possible to do block level volume restores, individual file level restores, or creation of a duplicate backup volume.

Figure 11:
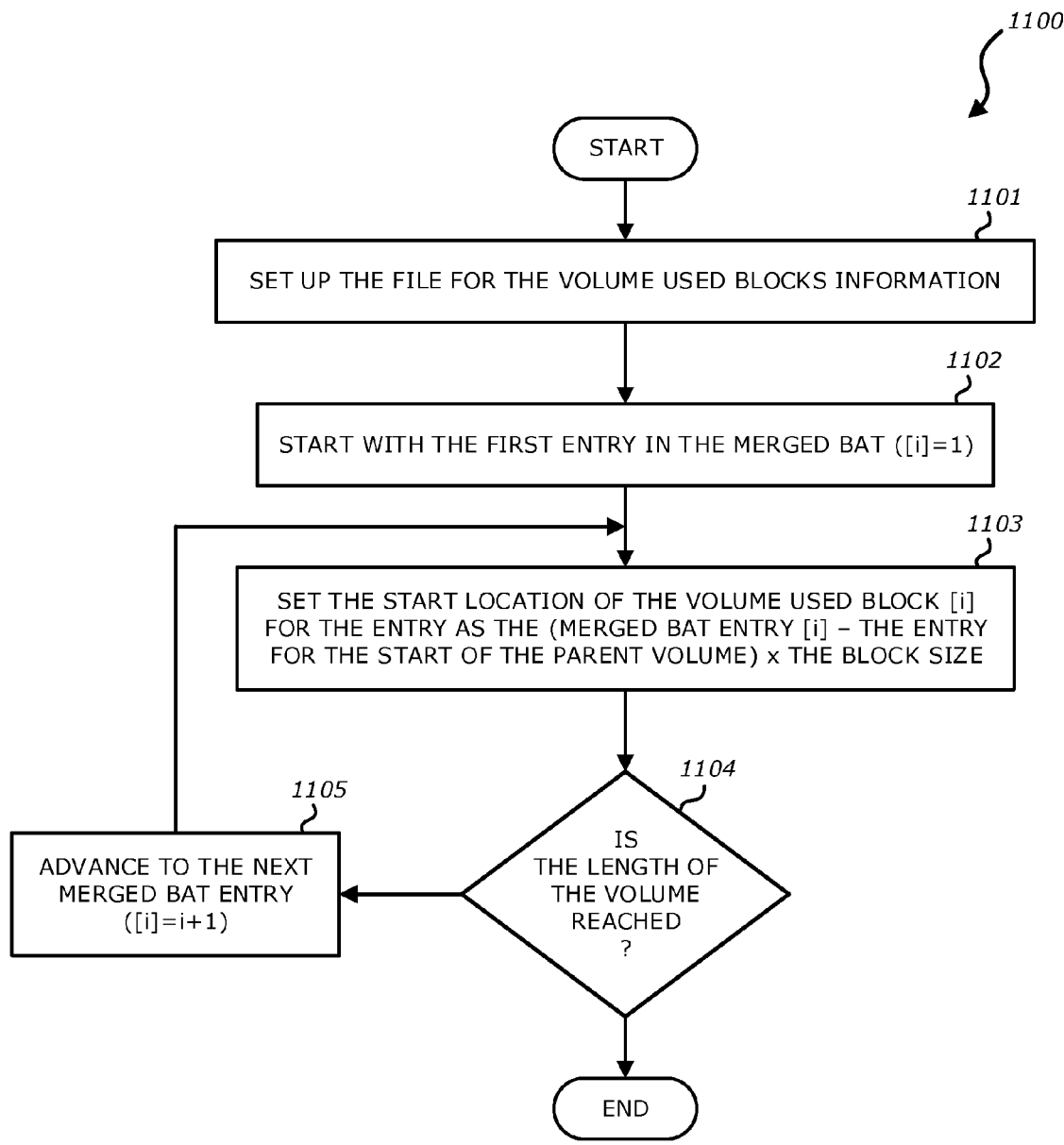
FIG. 11 illustrates an example flow diagram of a process for locating a target volume used block using the BAT in accordance with some embodiments.

FIG. 11 illustrates an example flow diagram of a process 1100 for locating a target volume used block using the BAT in accordance with some embodiments. The process 1000 starts at block 1001 with setting up a file for the volume used block information (e.g., volUsedBlocks[i]) that may include a start location of each volume used block (e.g., volUsedBlocks[i].start) and a length of each volume used block (e.g., volUsedBlocks[i].length). Setting up the file for the volume used block information may include initializing the file to null. In some embodiments, the file for the volume used block information is an array.

At block 1002, the process may start evaluating a first BAT entry (e.g., merged BAT 862 in FIG. 9) of the merged BAT (e.g., MergedBAT[i]) (e.g., BAT 882 in FIG. 9). At block 1003, an operation may be performed set the start location of the volume used block (e.g., volUsedBlocks[i].start) for the first BAT entry of the merged BAT (e.g., MergedBAT[i]). In one embodiment, the start location of the location of the volume used block (e.g., volUsedBlocks[i].start) is the result of the first BAT entry of the merged BAT minus the entry corresponding to the start of the parent volume (e.g., first_vol_BAT_entry) which is then multiplied by the block size (e.g., volUsedBlocks[i].start=(MergedBAT[i]−first_vol_BAT_entry)*block size). The block size may be the VHDx block size. In some embodiments, a BAT entry corresponding to a start of the parent volume (e.g., first_vol_BAT_entry) is obtained by parsing the entries in the BAT associated with the full backup information (e.g., BAT 810 in FIG. 6). For instance, the GPT may be parsed to identify the BAT entry corresponding to the start of the parent volume. In some embodiments, at block 1003, an operation may further be performed to set the length of each volume used block (e.g., volUsedBlocks[i].length) as the block size.

At block 1004, an operation may be performed to determine if the length of the volume has been reached. The entry in the merged BAT where the volume ends may be identified by the volume length. As above, the length of each volume used block (e.g., volUsedBlocks[i].length) may be the block size.

If the length of the volume has not been reached, the process may continue to block 1005, where the merged BAT entry is advanced to the next merged BAT entry (e.g., [i]=i+1). From block 1005, the process returns to block 1003, where the start location of the volume used block for the BAT entry is set. From block 1004, if the length of the volume has been reached, the process may stop.

Using the process 1000 illustrated in FIG. 10, the used block information for the parent volume are identified and the volume used blocks with respect to the volume start locations in the backup file is also identified.

Figure 12:
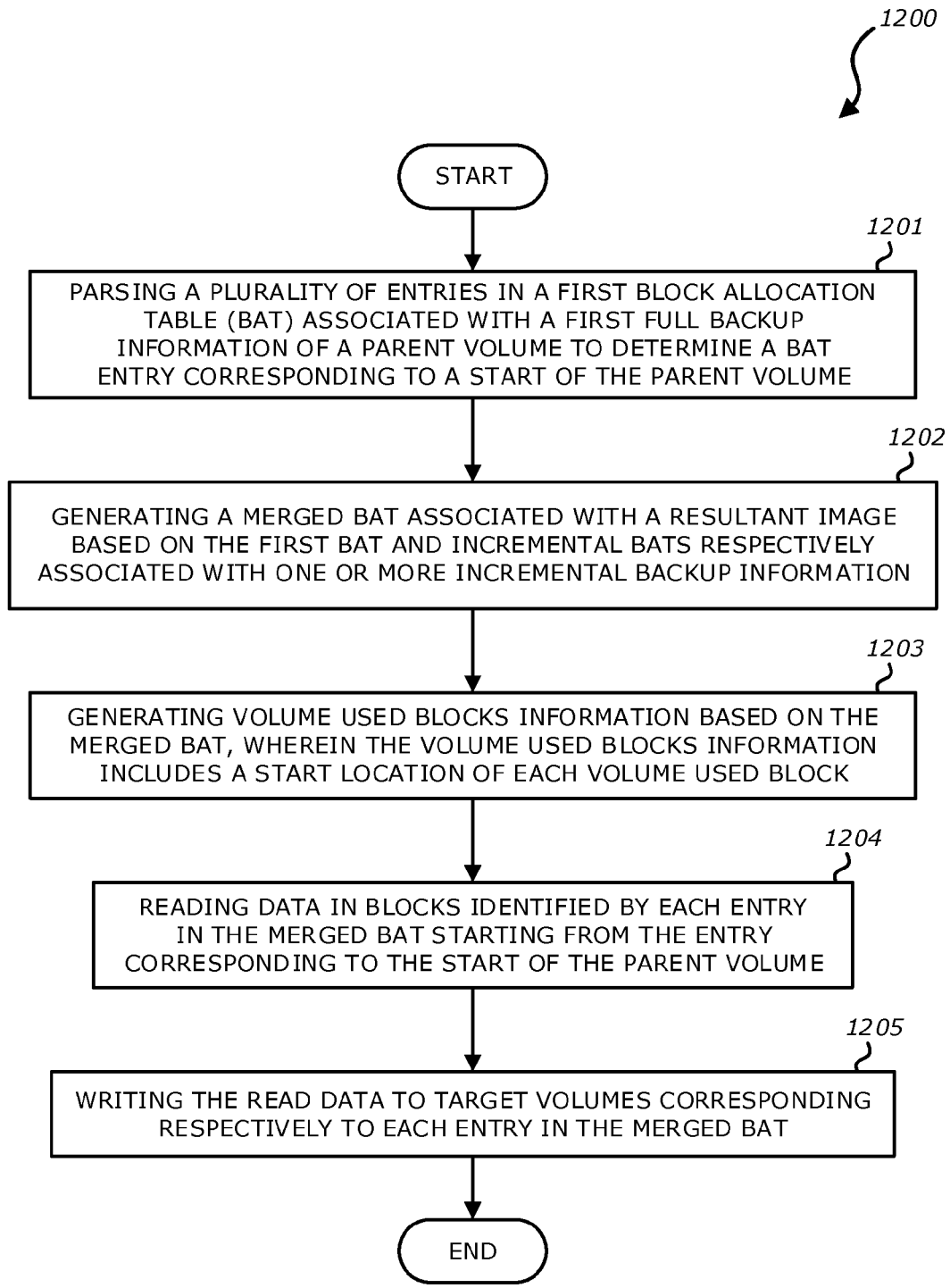
FIG. 12 is a flow diagram that illustrates an example process for performing an incremental restore from block-based backup, in accordance with some embodiments.

FIG. 12 is a flow diagram that illustrates an example process for performing an incremental restore from block-based backup, in accordance with some embodiments. The process 1200 starts at block 1201 by parsing the entries of a first BAT associated with a first full backup information of a parent volume to determine a BAT entry corresponding to a start of the parent volume. The first BAT table may be the BAT table in the VHDx from the level full backup image (e.g., BAT 810 in FIG. 6). In one embodiment, the first full backup information is stored in a virtual disk format is Hyper-V Virtual Hard Disk (VHDX) format. In one embodiment, parsing the entries in the first BAT is performed without mounting the first full backup information by an operating system. The parsing of the entries in the first BAT may include reading the first BAT to obtain disk location information within the VHDX and parsing the disk metadata including the GPT within the VHDX to obtain a volume data. Using the volume data, the BAT entry corresponding to the start of the parent volume may be identified. The BAT entry corresponding to an end of the parent volume may also be identified using a volume length associated with the volume data.

At block 1202, a merged BAT associated with a resultant image is generated based on the first BAT and incremental BATs respectively associated with one or more incremental backup information. The one or more incremental backup information is based on incremental changes to the parent volume subsequent to the first full backup information being generated. The merged BAT that is generated in accordance with the embodiments illustrated FIGS. 5-10 and discussed herein. At block 1203, a volume used blocks information based on the merged BAT is generated. The generated volume used blocks information may be stored in a file that is an array including a plurality of entries. Each of the plurality of entries is associated with a volume used block. In one embodiment, the volume used blocks information includes a start location of each volume used block and a length of each volume used block. In one embodiment, the start location of each volume used block is based on the entries in the merged BAT and the BAT entry corresponding to the start of the parent volume (FIG. 11). At block 1204, starting from the entry corresponding to the start of the parent volume, the data in blocks identified by each entry in the merged BAT are read and at block 1205, the read data is then written to target volumes corresponding respectively to each entry in the merged BAT. As shown in the embodiment in FIG. 11, the target volumes are identified using the volume used blocks information.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for performing an incremental restore from block-based backup, the method comprising:
    parsing a plurality of entries in a first block allocation table (BAT) associated with a first full backup information of a parent volume to determine a BAT entry corresponding to a start of the parent volume;
    generating a merged BAT associated with a resultant image based on the first BAT and incremental BATs respectively associated with one or more incremental backup information, wherein the one or more incremental backup information is based on incremental changes to the parent volume subsequent to the first full backup information being generated;
    generating volume used blocks information based on the merged BAT, wherein the volume used blocks information includes a start location of each volume used block;
    reading data in blocks identified by each entry in the merged BAT starting from the entry corresponding to the start of the parent volume; and
    writing the read data to target volumes corresponding respectively to each entry in the merged BAT.

2. The method of claim 1, wherein the entries of the first BAT correspond to payload blocks (PB) and sector bitmap blocks (SB) of the first full backup information.

3. The method of claim 2, wherein the merged BAT associated with the resultant image comprises updated offsets associated with the PBs of the first full backup information.

4. The method of claim 3, wherein the first full backup information is stored in a virtual disk format is Hyper-V Virtual Hard Disk (VHDX) format.

5. The method of claim 4, wherein parsing the entries in the first BAT is performed without mounting the first full backup information by an operating system.

6. The method of claim 4, wherein parsing the entries in the first BAT includes:
    reading the first BAT to obtain disk location information within the VHDX;
    parsing the disk metadata including the GUID Partition Table (GPT) within the VHDX to obtain a volume data;
    identifying the BAT entry corresponding to the start of the parent volume using the volume data; and
    identifying a BAT entry corresponding to an end of the parent volume using a volume length associated with the volume data.

7. The method of claim 1, wherein generating the merged BAT further comprises:
    for each incremental chain, updating the corresponding entry in the merged BAT when the BAT entries in the first BAT and incremental BATs is non-zero,
    wherein a plurality of incremental chains are formed by corresponding entries in the first BAT and the incremental BATs.

8. The method of claim 1, wherein the target volumes are identified using the volume used blocks information, wherein the volume used blocks information further includes a length of each volume used block, wherein the start location of each volume used block is based on the entries in the merged BAT and the BAT entry corresponding to the start of the parent volume.

9. A non-transitory computer-readable storage medium having instructions included therein, which when executed by a processor causes the processor to perform a method of performing an incremental restore from block-based backup comprising:
    parsing a plurality of entries in a first block allocation table (BAT) associated with a first full backup information of a parent volume to determine a BAT entry corresponding to a start of the parent volume;
    generating a merged BAT associated with a resultant image based on the first BAT and incremental BATs respectively associated with one or more incremental backup information, wherein the one or more incremental backup information is based on incremental changes to the parent volume subsequent to the first full backup information being generated;
    generating volume used blocks information based on the merged BAT, wherein the volume used blocks information includes a start location of each volume used block;
    reading data in blocks identified by each entry in the merged BAT starting from the entry corresponding to the start of the parent volume; and
    writing the read data to target volumes corresponding respectively to each entry in the merged BAT.

10. The computer-readable storage medium of claim 9, wherein the entries of the first BAT correspond to payload blocks (PB) and sector bitmap blocks (SB) of the first full backup information.

11. The computer-readable storage medium of claim 10, wherein the merged BAT associated with the resultant image comprises updated offsets associated with the PBs of the first full backup information.

12. The computer-readable storage medium of claim 11, wherein the first full backup information is stored in a virtual disk format is Hyper-V Virtual Hard Disk (VHDX) format.

13. The computer-readable storage medium of claim 12, wherein parsing the entries in the first BAT is performed without mounting the first full backup information by an operating system.

14. The computer-readable storage medium of claim 13, wherein parsing the entries in the first BAT includes:
   reading the first BAT to obtain disk location information within the VHDX;
   parsing the disk metadata including the GUID Partition Table (GPT) within the VHDX to obtain a volume data;
   identifying the BAT entry corresponding to a start of the parent volume using the volume data; and
   identifying a BAT entry corresponding to an end of the parent volume using a volume length associated with the volume data.

15. The computer-readable storage medium of claim 9, wherein generating the merged BAT further comprises:
   for each incremental chain, updating the corresponding entry in the merged BAT when the BAT entries in the first BAT and incremental BATs is non-zero,
   wherein a plurality of incremental chains are formed by corresponding entries in the first BAT and the incremental BATs.

16. The computer-readable storage medium of claim 9, wherein the target volumes are identified using the volume used blocks information, wherein the volume used blocks information further includes a length of each volume used block, wherein the start location of each volume used block is based on the entries in the merged BAT and the BAT entry corresponding to the start of the parent volume.

17. A system comprising:
   a non-transitory machine-readable storage device to store a first full backup information of a parent volume and a resultant image,
   one or more incremental backup information that is based on incremental changes to the parent volume subsequent to the first full backup information being generated,
   a first block allocation table (BAT) associated with the first full backup information, a merged BAT associated with the resultant image, and incremental BATs respectively associated with the one or more incremental backup information, and
   volume used blocks information that includes a start location of each volume used block; and
   a processor coupled to the storage to
      parse a plurality of entries in the first BAT to determine a BAT entry corresponding to a start of the parent volume,
      generate the merged BAT based on the first BAT and incremental BATs,
      generating the volume used blocks information based on the merged BAT,
      read data in blocks identified by each entry in the merged BAT starting from the entry corresponding to the start of the parent volume, and
      write the read data to target volumes corresponding respectively to each entry in the merged BAT.

18. The system of claim 17, wherein generates the volume used blocks information further includes a length of each volume used block.

19. The system of claim 18, wherein the processor further to identify the target volumes using the volume used blocks information.

20. The system of claim 17, wherein the first full backup information is stored in a virtual disk format is Hyper-V Virtual Hard Disk (VHDX) format, wherein parsing the entries in the first BAT includes:
   reading the first BAT to obtain disk location information within the VHDX;
   parsing the disk metadata including the GUID Partition Table (GPT) within the VHDX to obtain a volume data; and
   identifying the BAT entry corresponding to the start of the parent volume using the volume data,
   wherein parsing the entries in the first BAT is performed without mounting the first full backup information by an operating system.

* * * * *